(12) United States Patent
Isaacson

(10) Patent No.: US 9,715,679 B2
(45) Date of Patent: Jul. 25, 2017

(54) SYSTEM AND METHOD FOR DISPLAYING MULTIPLE TIME ZONES IN AN ONLINE CALENDAR VIEW

(75) Inventor: Scott Isaacson, Kamuela, HI (US)

(73) Assignee: NOVELL, INC., Provo, UT (US)

( * ) Notice: Subject to any disclaimer, the term of this patent is extended or adjusted under 35 U.S.C. 154(b) by 2569 days.

(21) Appl. No.: 12/116,363

(22) Filed: May 7, 2008

(65) Prior Publication Data

US 2009/0281859 A1 Nov. 12, 2009

(51) Int. Cl.
*G06Q 10/00* (2012.01)
*G06Q 10/10* (2012.01)

(52) U.S. Cl.
CPC ....... *G06Q 10/109* (2013.01); *G06Q 10/1093* (2013.01)

(58) Field of Classification Search
USPC ......................................................... 705/8–9
See application file for complete search history.

(56) References Cited

U.S. PATENT DOCUMENTS

| | | | | |
|---|---|---|---|---|
| 5,323,314 A | * | 6/1994 | Baber et al. | 705/8 |
| 5,842,009 A | * | 11/1998 | Borovoy | G06Q 10/109 |
| 2005/0102245 A1 | * | 5/2005 | Edlund et al. | 705/80 |
| 2006/0129626 A1 | * | 6/2006 | Fitzpatrick | G06Q 10/1095 709/200 |
| 2006/0241998 A1 | * | 10/2006 | Rokosz | G06Q 10/109 705/7.13 |
| 2006/0271526 A1 | * | 11/2006 | Charnock et al. | 707/3 |
| 2007/0186193 A1 | * | 8/2007 | Curran | G06Q 10/109 715/780 |
| 2007/0239506 A1 | * | 10/2007 | Jania | G06Q 10/109 705/7.18 |
| 2008/0109718 A1 | * | 5/2008 | Narayanaswami | 715/262 |

* cited by examiner

*Primary Examiner* — Tonya Joseph
(74) *Attorney, Agent, or Firm* — Haynes and Boone, LLP

(57) ABSTRACT

Method and system for presenting a view of a calendar on an electronic display. In one embodiment, the method comprises presenting on the display an entry corresponding to a scheduled meeting having at least two participants; presenting on the display a first timeline associated with a first one of the participants, the first timeline comprising an incremental listing of time of day in accordance with a first time zone; presenting on the display a second timeline adjacent the first timeline, the second timeline associated with a second one of the participants and comprising an incremental listing of time of day in accordance with a second time zone; and wherein the entry is presented on the display relative to the first and second timelines to thereby reflect start and end times of the scheduled meeting relative to each of the first and second time zones.

20 Claims, 6 Drawing Sheets

SYSTEM AND METHOD FOR DISPLAYING MULTIPLE TIME ZONES IN AN ONLINE CALENDAR VIEW

BACKGROUND

We live in world in which people interact with each other on a global scale. With the proliferation of off-shoring, outsourcing, and other cooperative business arrangements, as well as general progression toward a global economy, driving geographic diversity, people located in countries across the globe are obliged to interact with one another on a regular basis. Telephone, video, and web conferencing technologies have done much to facilitate communication between people dispersed across the globe and situated in different time zones.

SUMMARY

One embodiment is a method for presenting a view of a calendar on an electronic display. The method comprises presenting on the display an entry corresponding to a scheduled meeting having at least two participants; presenting on the display a first timeline associated with a first one of the participants, the first timeline comprising an incremental listing of time of day in accordance with a first time zone associated with the first one of the participants; presenting on the display a second timeline adjacent the first timeline, the second timeline associated with a second one of the participants and comprising an incremental listing of time of day in accordance with a second time zone associated with the second one of the participants; and wherein the entry is presented on the display relative to the first and second timelines so as to accurately reflect start and end times of the scheduled meeting relative to each of the first and second time zones.

DETAILED DESCRIPTION

This disclosure relates generally to online calendaring applications and, more specifically, to system and method for displaying multiple time zones in a day view of an online calendar.

It will be recognized that most, if not all, online calendaring and scheduling tools that are currently available facilitate the scheduling of meetings involving participants dispersed across multiple time zones. For example, Novell's GroupWise® product allows a user to select a time zone to be associated with the user's account and, during scheduling of a meeting, displays on the scheduling view the time zone associated with each prospective meeting participant. It is noted that other products include similar functionality. However, currently available online calendaring and scheduling tools fail to display the various time zones in effect for the participants in a given meeting in the day view or meeting view of the calendar for that meeting.

Such time zone information would be useful for making decisions during a meeting. For example, a comment by a meeting participant that a report is due "tomorrow morning" will mean one thing to a participant in a time zone where the current day is the same as that of the speaker and something totally different to a participant located in a time zone in which the current day is not the same as that of the speaker. Hence, for a participant who is unaware of the current time as experienced by the other meeting participants, even a seemingly straightforward observation or instruction could be misinterpreted by one or more other participants.

As previously noted, a variety of online calendaring and scheduling products are currently available and the embodiments described herein are applicable to all such product; however, for the sake of simplicity and example, the embodiments will be described with reference to Novell's GroupWise® product. It should be understood, however, that the embodiments are not limited to such application.

Figure 1:
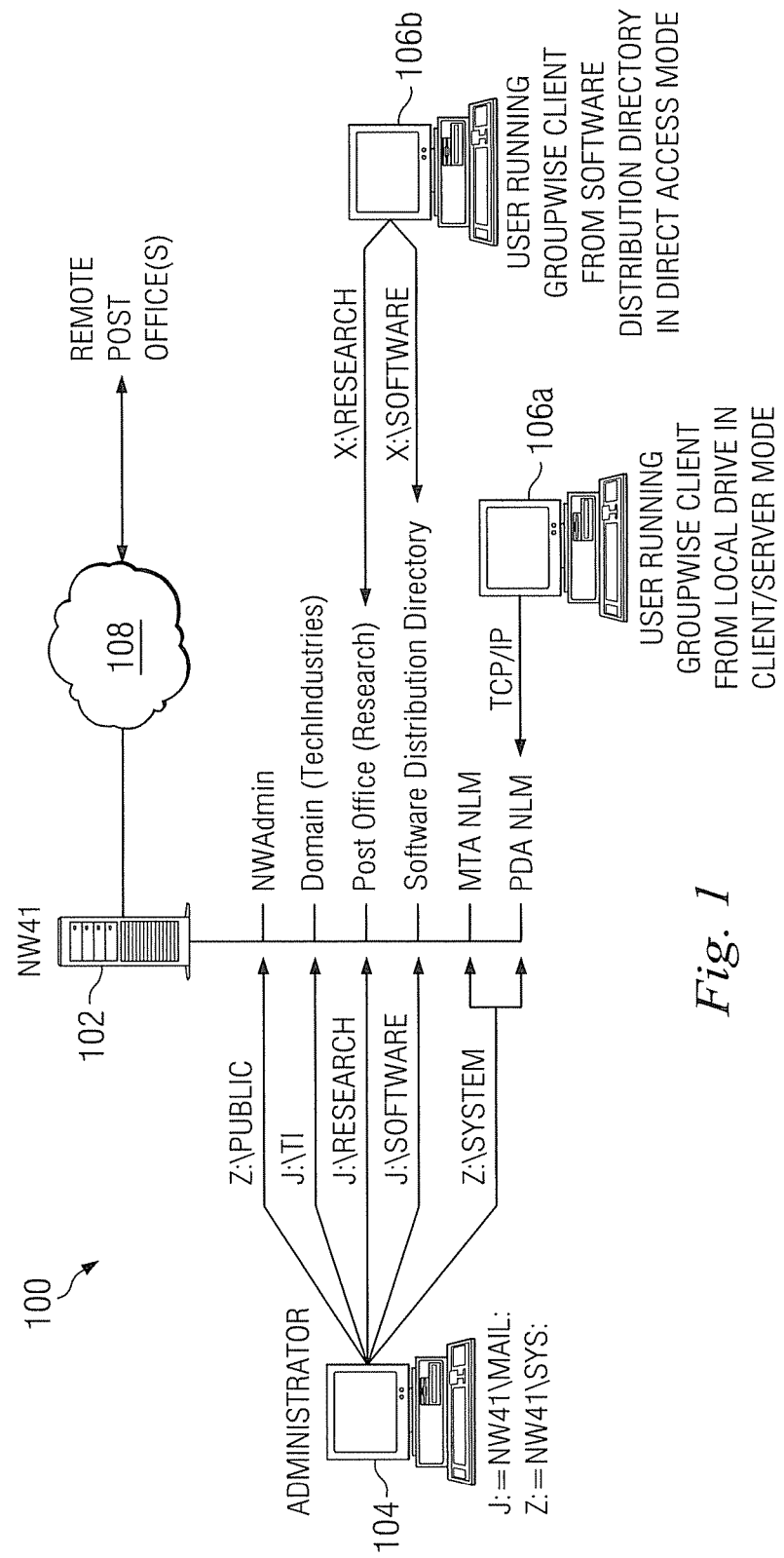
FIG. 1 is a block diagram of a conventional collaborative electronic communications system in accordance with one embodiment.

FIG. 1 is a block diagram of an embodiment of a conventional GroupWise system 100. The system 100 includes a NetWare ("NW") server 102 to which is connected a NetWare administrator ("NWA") workstation 104 and a plurality of user workstations, represented in FIG. 1 by user workstations 106*a* and 106*b*. Each of the user workstations 106*a*, 106*b*, is configured to run GroupWise client software installed on a hard drive of the respective workstation. It will be recognized that GroupWise client software may be installed on the workstations from one or more CDs or servers or may be uploaded thereto via a variety of wired and/or wireless transmission media. In one embodiment, each user registered with GroupWise is assigned a GroupWise user account by a system administrator via the NWA workstation 104. As will be recognized by those of ordinary skill in the art, each user account may be defined so as to have a time zone associated therewith. Additionally, each user workstation 106*a*, 106*b*, has a time zone associated therewith. As will be recognized by those of ordinary skill in the art, the NW server 102 is connected, e.g., via an Internet connection 108, to remote post offices hosted on one or more other NW servers.

Figure 2:
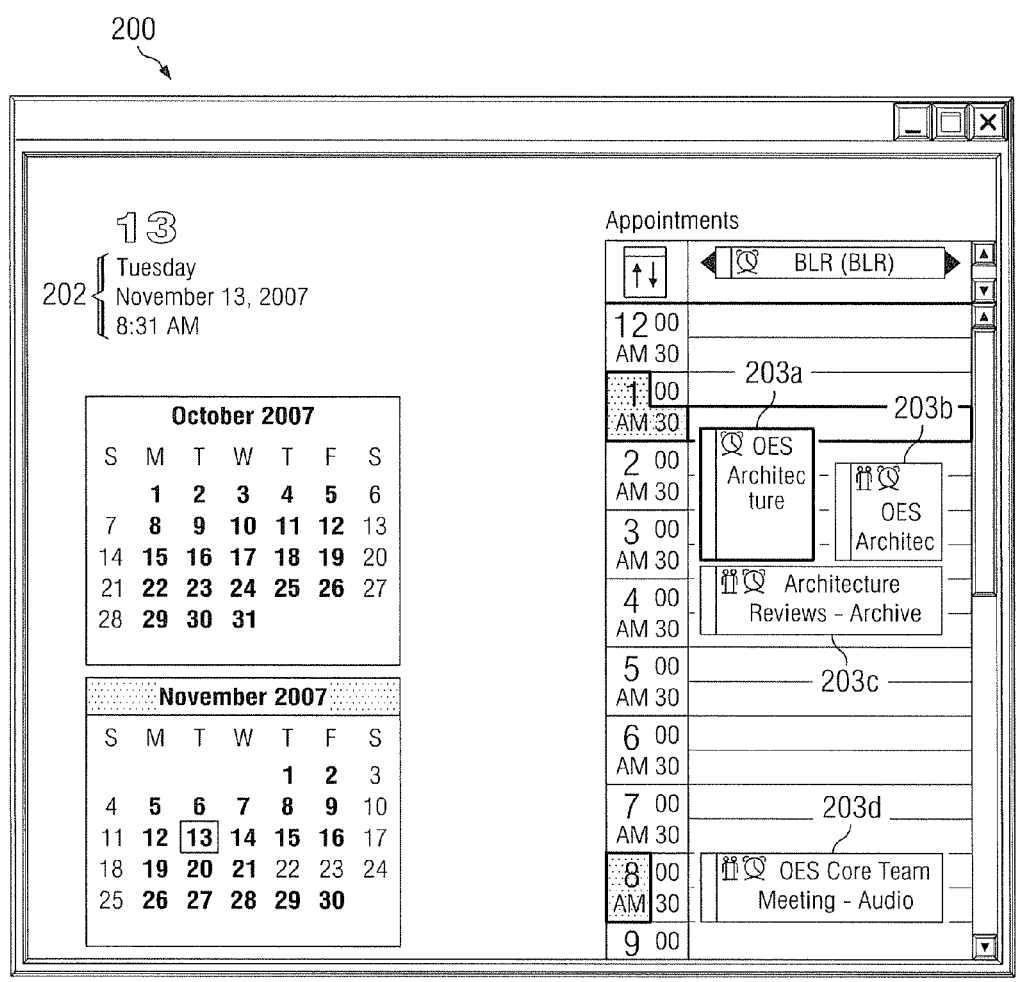
FIG. 2 illustrates a day view of an online calendaring tool in accordance with the prior art.

FIG. 2 illustrates an exemplary day view 200 of a calendar such as may be presented on a GroupWise user workstation (i.e., a user workstation executing GroupWise client software) in accordance with the prior art. It will be assumed for the sake of example that a workstation on which the day view 200 is displayed is associated with the Mountain Standard time zone ("MST"). It will be noted from the day view 200 that the current day, date, and time in MST, as indicated in an area 202, is Tuesday, Nov. 13, 2007, 8:31 AM. A plurality of meetings, represented by entries 203*a*-203*d*, are scheduled for the displayed day. The meeting times are displayed relative to the associated time zone (MST); therefore, the start times for the meetings represented by entries 203*a*-203*d*, are approximately 1:45 AM MST, 2:15 AM MST, 3:45 AM MST, and 7:30 AM MST, respectively.

Figure 3:
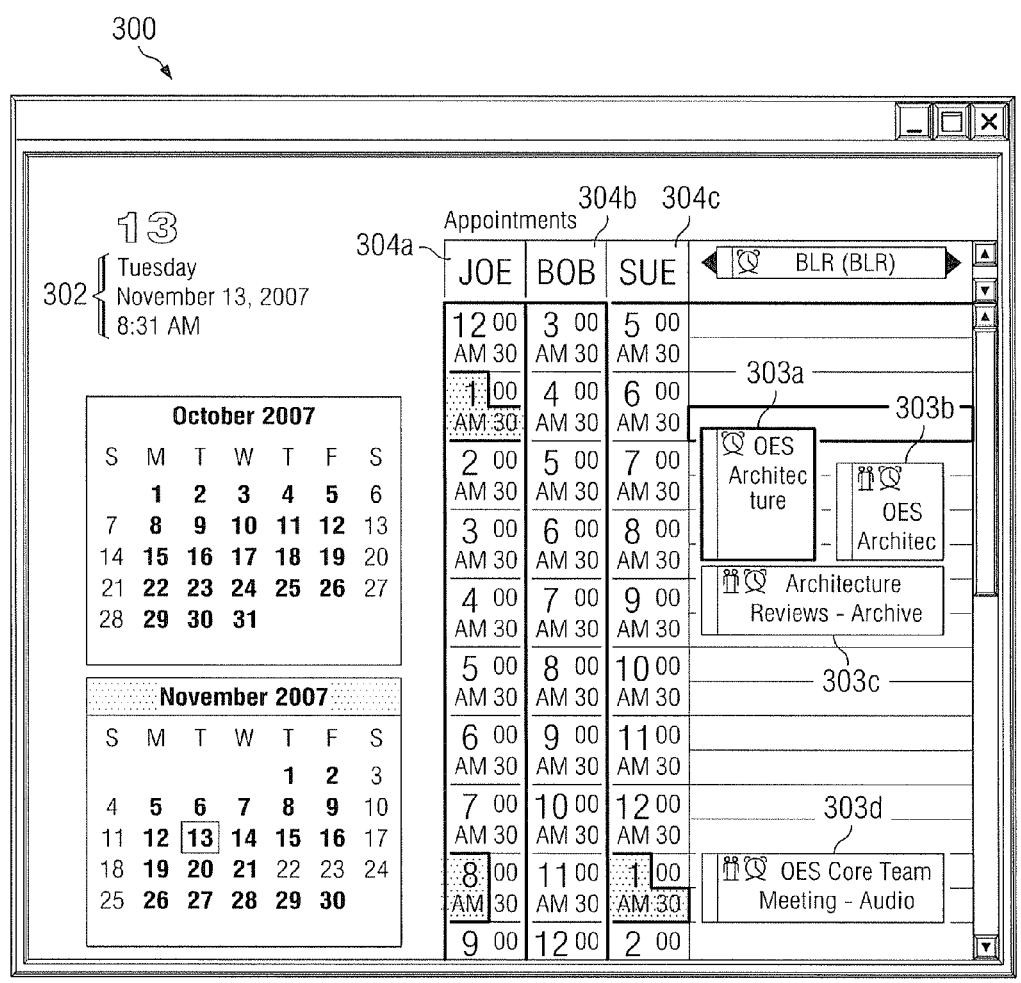
FIG. 3 illustrates a day view of an online calendaring tool in accordance with one embodiment.

FIG. 3 illustrates an exemplary day view 300 of a calendar presented on a GroupWise user workstation in accordance with embodiments described herein. It will once again be assumed for the sake of example that a workstation on which the day view 300 is associated with MST and that the current day, date, and time in MST, as indicated in an area 302, is Tuesday, Nov. 13, 2007, 8:31 AM. A plurality of meetings, represented by entries 303a-303d, are scheduled for the displayed day. For purposes of illustration, it will be assumed that each of three people ("Joe," "Bob," and "Sue") will participate in at least one of the scheduled meetings. It will be further assumed that Joe is the owner of the displayed calendar.

In accordance with features of one embodiment, the day view 300 includes a timeline corresponding to the time zone of each of the participants. In particular, a first timeline 304a corresponds to Joe's time zone (MST), a second timeline 304b corresponds to Bob's time zone, and a third timeline 304c corresponds to Sue's time zone. Accordingly, the meeting represented by the entry 303a is scheduled for 1:45 AM relative to Joe's time zone, 4:45 AM relative to Bob's time zone, and 6:45 AM relative to Sue's time zone. Similarly, the meeting represented by the entry 303b is scheduled for 2:30 AM relative to Joe's selected time zone, 5:30 AM relative to Bob's time zone, and 7:30 AM relative to Sue's time zone. The timelines 304a, 304b, and 304c, represent time in 30 minute increments, although other increment values (e.g., 1 hour or 10 minute) may be used.

It will be recognized that time relative to a particular time zone may be represented in other manners than that explicitly illustrated in FIGS. 3-6; therefore, as used herein, the term "timeline" refers to any such representation of time relative to a user's time zone, including, but not limited to, text tables, lists, and pop-ups, for example.

For purposes of illustration below, it will be assumed that Joe and Bob are scheduled participants in the meeting represented by the entry 303a, Joe and Sue are scheduled participants in the meeting represented by the entry 303b, and Joe, Bob, and Sue are all scheduled participants in the meeting represented by the entries 303c and 303d.

Figure 4:
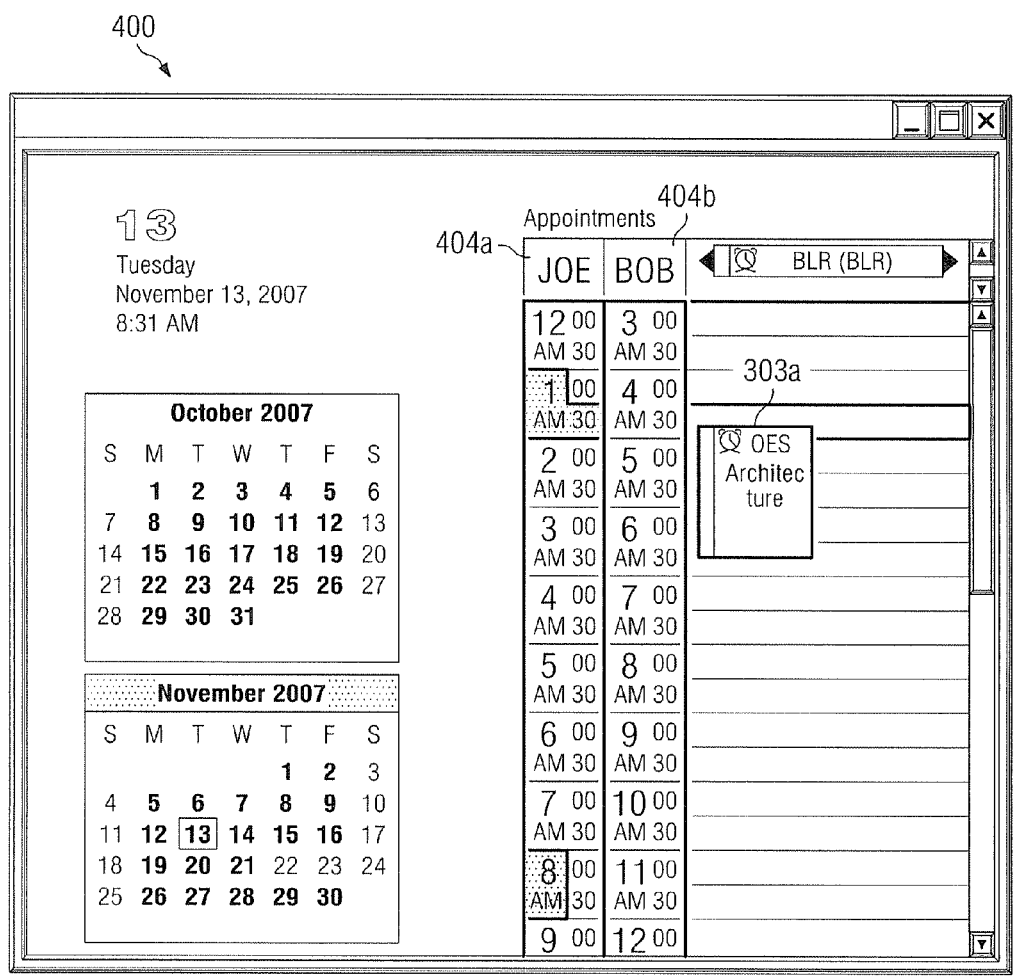
FIG. 4 illustrates a first meeting view of an online calendaring tool in accordance with one embodiment.
Figure 5:
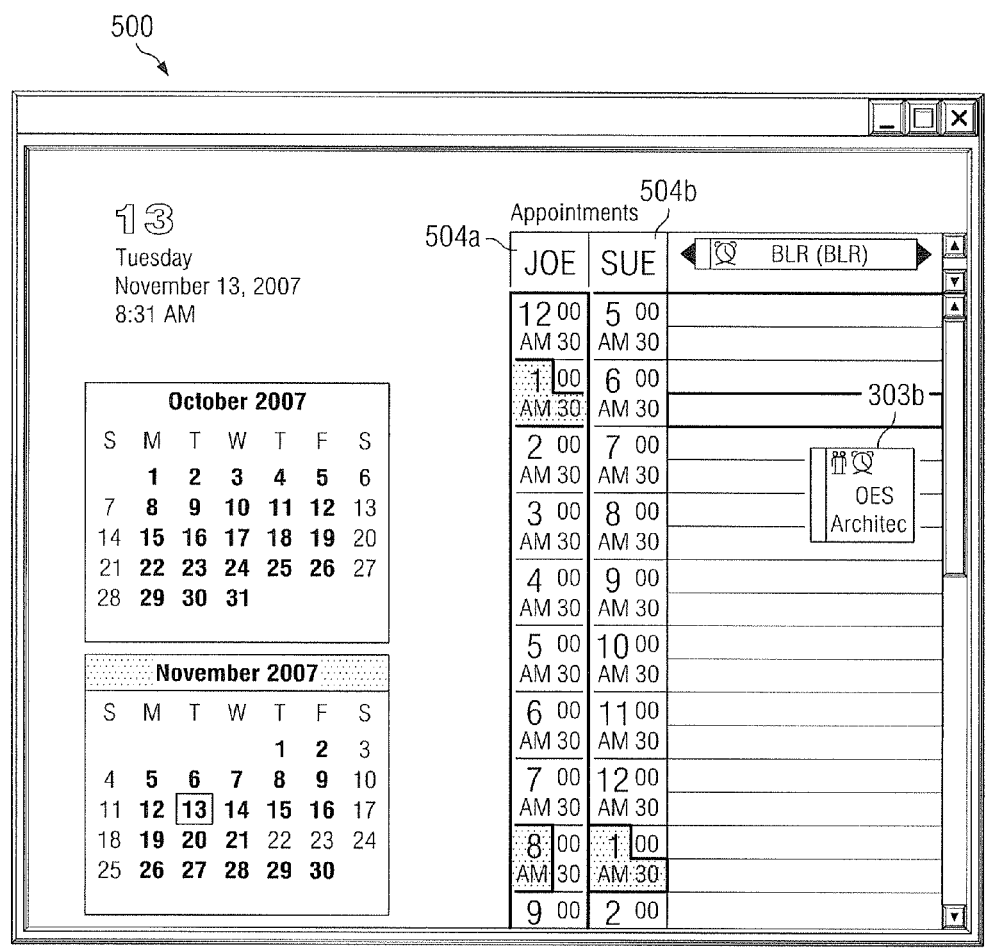
FIG. 5 illustrates a second meeting view of an online calendaring tool in accordance with one embodiment.
Figure 6:
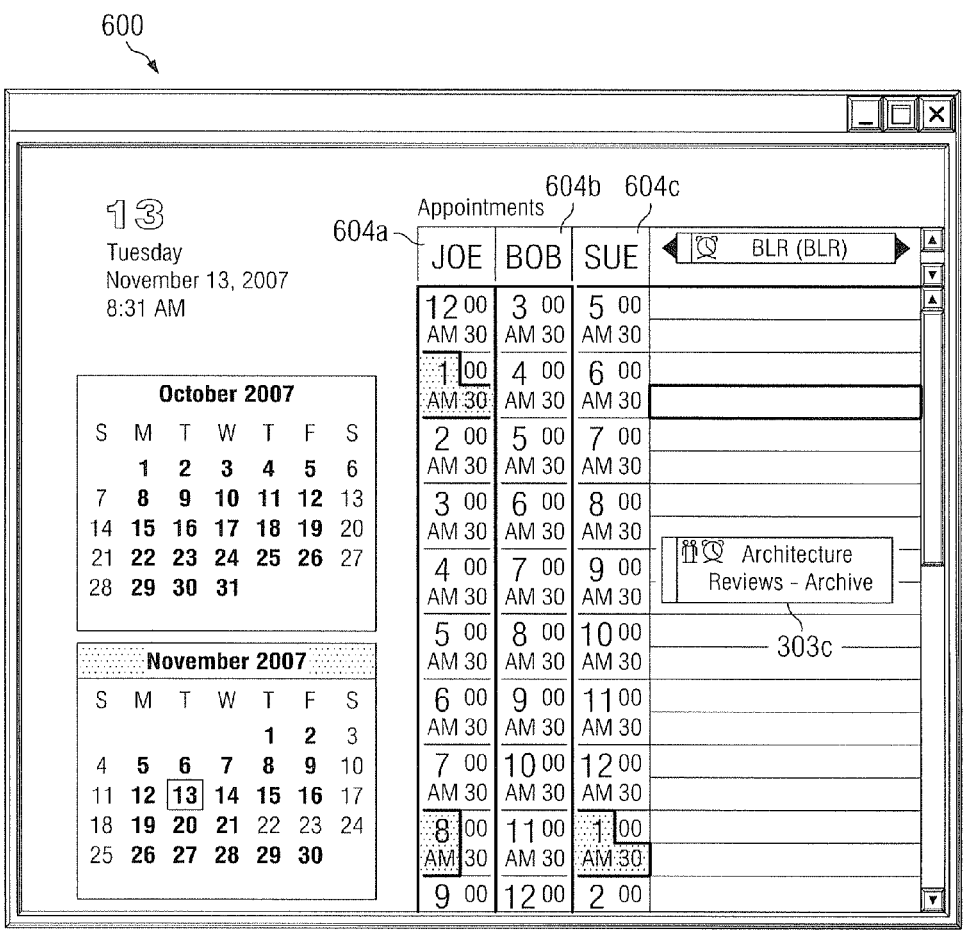
FIG. 6 illustrates a third meeting view of an online calendaring tool in accordance with one embodiment.

FIG. 4 illustrates a meeting view 400 of the calendar presented on a GroupWise user workstation in accordance with embodiments described herein responsive to selection of the entry 303a. As previously noted, only Joe and Bob are scheduled participants in the selected meeting; therefore, only two timelines 404a, 404b, are displayed, respectively corresponding to Joe's and Bob's time zones. Similarly, FIG. 5 illustrates a meeting view 500 of the calendar responsive to selection of the entry 303b. As previously noted, only Joe and Sue are scheduled participants in the selected meeting; therefore, only two timelines 504a, 504b, are displayed, respectively corresponding to Joe's and Sue's time zones. Finally, FIG. 6 illustrates a meeting view 600 of the calendar responsive to selection of the entry 303c. As previously noted, Joe, Bob, and Sue are all scheduled participants in the selected meeting; therefore, three timelines 604a, 604b, and 604c are displayed, respectively corresponding to Joe's, Bob's, and Sue's time zones.

It will be noted that in many cases, there will be more participants in a meeting than is convenient to represent with an individual timeline. In such cases, the participants may be grouped according to time zone and timelines are provided which correspond to each such group time zone. In such an embodiment, the individual participants to which a particular time zone corresponds may be displayed, for example, when the mouse cursor is placed over a portion of the timeline associated with the time zone or via some other method. Referring to FIG. 3, for example, each of the timelines 304a, 304b, and 304c, may be designated by a term or phrase representative of the group of participants within the represented time zone (such as name of the time zone or a name for the group of participants), instead of "JOE," "BOB," and "SUE," respectively. The same is true for the meeting views shown in FIGS. 4-6.

Moreover, if there are still too many timelines to conveniently display in a single view, other mechanisms, such as scroll bars and the like, may be used to enable the user selectively to view the appropriate timelines and the time zones represented thereby.

It is understood that modifications, changes and substitutions are intended in the foregoing disclosure and in some instances some features of the embodiments will be employed without a corresponding use of other features. For example, embodiments described herein may be implemented in connection with other online calendaring products, such as, for example, Microsoft Outlook® and Lotus Notes®. Accordingly, it is appropriate that the appended claims be construed broadly and in a manner consistent with the scope of the embodiments described herein.

Although the present disclosure has described embodiments relating to specific networking environments, it is understood that the apparatus, systems and methods described herein could applied to other environments. While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method for presenting a view of a calendar on an electronic display, the method comprising:
   presenting on the display a entry corresponding to a scheduled meeting having at least two participants;
   presenting on the display a first timeline associated with a first one of the participants, the first timeline comprising an incremental listing of time of day in accordance with a first time zone associated with the first one of the participants;
   presenting on the display a second timeline adjacent the first timeline, the second timeline associated with a second one of the participants and comprising an incremental listing of time of day in accordance with a second time zone associated with the second one of the participants, wherein the second time zone is different than the first time zone, wherein the entry corresponding to the scheduled meeting is presented on the display relative to the first and second timelines thereby reflecting start and end times of the scheduled meeting relative to each of the first and second time zones; and
   responsive to selection of the entry corresponding to the scheduled meeting presented on the display relative to the first and second timelines, presenting on the display a meeting view including the first and second timelines for the scheduled meeting to which the selected entry corresponds.

2. The method of claim 1 further comprising, for each of the timelines, identifying in connection with each of the timelines the participant with whom the timeline is associated.

3. The method of claim 1 further comprising:
- presenting on the display a second entry corresponding to a second scheduled meeting having at least two participants, wherein a first one of the second scheduled meeting participants is identical to the first one of the first scheduled meeting participants and a second one of the second scheduled meeting participants is different from all of the first scheduled meeting participants;
- presenting on the display a third timeline adjacent the second timeline, the third timeline associated with the second one of the second scheduled meeting participants, and comprising an incremental listing of time of day in accordance with a third time zone associated with the second one of the second scheduled meeting participants; and
- wherein the second entry corresponding to the second scheduled meeting is presented on the display relative to the first and third timelines thereby reflecting start and end times of the second scheduled meeting relative to each of the first and third time zones.

4. The method of claim 3 further comprising, responsive to selection of the second entry corresponding to the second scheduled meeting presented on the display relative to the first and third timelines, presenting on the display a second meeting view including the first and third timelines for the second scheduled meeting to which the selected second entry corresponds.

5. The method of claim 1 wherein the presenting on the display a meeting view comprises presenting on the display only those timelines associated with participants in the meeting to which the selected entry corresponds.

6. The method of claim 1 wherein the presenting on the display a meeting view further comprises presenting on the display only the entry comprising the selected entry and including details thereof, the selected entry being presented on the display relative to the timelines associated with participants in the meeting to which the selected entry corresponds thereby reflecting start and end times of the scheduled meetings relative to the time zones of the participants in the meeting to which the selected entry corresponds.

7. The method of claim 1 wherein the first timeline is associated with a first plurality of participants, wherein each of the first plurality of participants is associated with the first time zone, and the second timeline is associated with a second plurality of participants, wherein each of the second plurality of participants is associated with the second time zone.

8. A computer program product for presenting a view of a calendar on an electronic display connected to a computer, the computer program product comprising:
- a non-transitory computer-readable medium having stored thereon instructions executable by a computer for causing the computer to:
  - present on the display a entry corresponding to a scheduled meeting having at least two participants;
  - present on the display a first timeline associated with a first one of the participants, the first timeline comprising an incremental listing of time of day in accordance with a first time zone associated with the first one of the participants; and
  - present on the display a second timeline adjacent the first timeline, the second timeline associated with a second one of the participants and comprising an incremental listing of time of day in accordance with a second time zone associated with the second one of the participants, wherein the second time zone is different than the first time zone, wherein the entry corresponding to the scheduled meeting is presented on the display relative to the first and second timelines thereby reflecting start and end times of the scheduled meeting relative to each of the first and second time zones; and
  - responsive to selection of the entry corresponding to the scheduled meeting presented on the display relative to the first and second timelines, presenting on the display a meeting view including the first and second timelines for the scheduled meeting to which the selected entry corresponds.

9. The computer program product of claim 8 wherein the non-transitory computer-readable medium further has stored thereon computer-executable instructions for causing the computer to provide in connection with each of the timelines an indication of the participant with whom the timeline is associated.

10. The computer program product of claim 8 wherein the non-transitory computer-readable medium further has stored thereon computer-executable instructions for causing the computer to:
- present on the display a second entry corresponding to a second scheduled meeting having at least two participants, wherein a first one of the second scheduled meeting participants is identical to the first one of the first scheduled meeting participants and a second one of the second scheduled meeting participants is different from all of the first scheduled meeting participants; and
- present on the display a third timeline adjacent the second timeline, the third timeline associated with the second one of the second scheduled meeting participants, and comprising an incremental listing of time of day in accordance with a third time zone associated with the second one of the second scheduled meeting participants;
- wherein the second entry corresponding to the second scheduled meeting is presented on the display relative to the first and third timelines thereby reflecting start and end times of the second scheduled meeting relative to each of the first and third time zones.

11. The computer program product of claim 10 wherein the non-transitory computer-readable medium further has stored thereon computer-executable instructions for causing the computer to, responsive to selection of the second entry corresponding to the second meeting presented on the display relative to the first and third timelines, present on the display a second meeting view including the first and third timelines for the second scheduled meeting to which the selected second entry corresponds.

12. The computer program product of claim 8 wherein the computer-executable instructions for causing the computer to present on the display a meeting view comprises computer-executable instructions for causing the computer to present on the display only those timelines associated with participants in the meeting to which the selected entry corresponds.

13. The computer program product of claim 8 wherein the computer-executable instructions for causing the computer to present on the display a meeting view further comprises computer-executable instructions for causing the computer to present on the display only the entry comprising the selected entry and including details thereof, the selected entry being presented on the display relative to the timelines associated with participants in the meeting to which the selected entry corresponds thereby reflecting start and end times of the scheduled meetings relative to the time zones of the participants in the meeting to which the selected entry corresponds.

14. The computer program product of claim 8 wherein the first timeline is associated with a first plurality of participants, wherein each of the first plurality of participants is associated with the first time zone, and the second timeline is associated with a second plurality of participants, wherein each of the second plurality of participants is associated with the second time zone.

15. A method for representing a day view of an online calendar product on an electronic display, the method comprising:

for each participant in a scheduled meeting, presenting on the display a timeline associated with the participant, the timeline comprising an incremental listing of time of day in accordance with a time zone associated with the participant, wherein at least two of the time zones are different;

presenting on the display an entry representative of the scheduled meeting, wherein the entry representative of the scheduled meeting is positioned on the display relative to the timelines thereby reflecting start and end times of the scheduled meeting relative to each of the time zones; and responsive to selection of the entry representative of the scheduled meeting positioned on the display relative to the timelines, presenting on the display a meeting view including a first and a second timeline for the scheduled meeting to which the selected entry corresponds.

16. The method of claim 15 further comprising providing in connection with each of the timelines an indication of the participant with whom the timeline is associated.

17. The method of claim 15 further comprising:

for each participant in a second scheduled meeting, presenting on the display a timeline associated with the second meeting participant, the timeline comprising an incremental listing of time of day in accordance with a time zone associated with the second meeting participant; and presenting on the display a second entry representative of the second scheduled meeting, wherein the second entry representative of the second scheduled meeting is positioned on the display relative to the timelines associated with the second meeting participants thereby reflecting start and end times of the second scheduled meeting relative to each of the time zones associated with the second meeting participants.

18. The method of claim 17 further comprising, responsive to selection of the second entry representative of the second scheduled meeting presented on the display relative to the timelines, presenting on the display a second meeting view for the second scheduled meeting to which the selected second entry corresponds.

19. The method of claim 15 wherein the presenting on the display a meeting view comprises presenting on the display only those timelines associated with participants in the scheduled meeting to which the selected entry corresponds.

20. The method of claim 15 wherein each of the timelines is associated with a group participants, the time zone represented by the timeline is associated with each participant in the group of participants.

* * * * *